D. J. MARTIN.
TIRE CHAIN.
APPLICATION FILED SEPT. 25, 1911.

1,059,183.

Patented Apr. 15, 1913.

WITNESSES
C. K. Reichenbach.
W. S. Orton.

INVENTOR
Douglas J. Martin
BY Munn Co.
ATTORNEYS

UNITED STATES PATENT OFFICE.

DOUGLAS J. MARTIN, OF NEW YORK, N. Y.

TIRE-CHAIN.

1,059,183. Specification of Letters Patent. Patented Apr. 15, 1913.

Application filed September 25, 1911. Serial No. 651,194.

*To all whom it may concern:*

Be it known that I, DOUGLAS J. MARTIN, a citizen of the United States, and a resident of the city of New York, borough of Manhattan, in the county and State of New York, have invented a new and Improved Tire-Chain, of which the following is a full, clear, and exact description.

My invention relates to anti-skid devices adapted to be positioned about the tire of a traction wheel, and particularly relates to means for maintaining the chains in spaced-apart position on the tire.

An object of my invention is to provide an auxiliary reinforcement for the tread-engaging portion of the tire, to hold the device in position on the wheel even should some of the tread-links of the chain construction break.

This is intended as an improvement in the device disclosed in my pending application No. 638,634, filed July 15, 1911.

Reference is to be had to the accompanying drawings forming a part of this specification, in which similar characters of reference indicate corresponding parts in both of the views, and in which—

Figure 1:
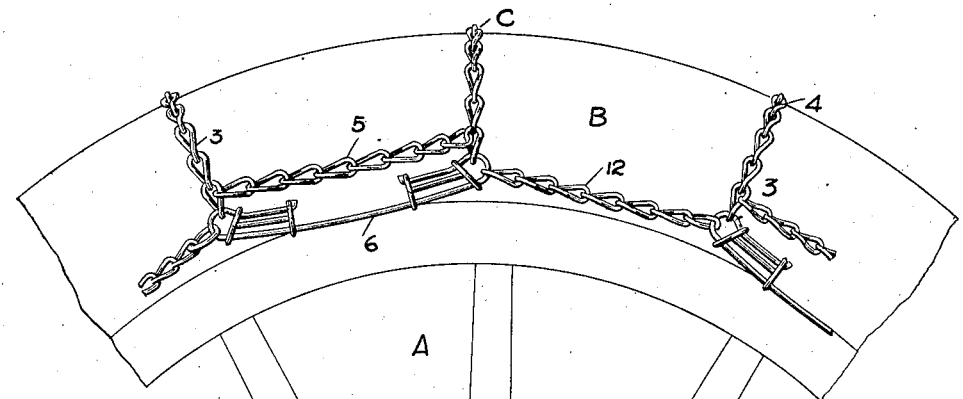
Figure 2:
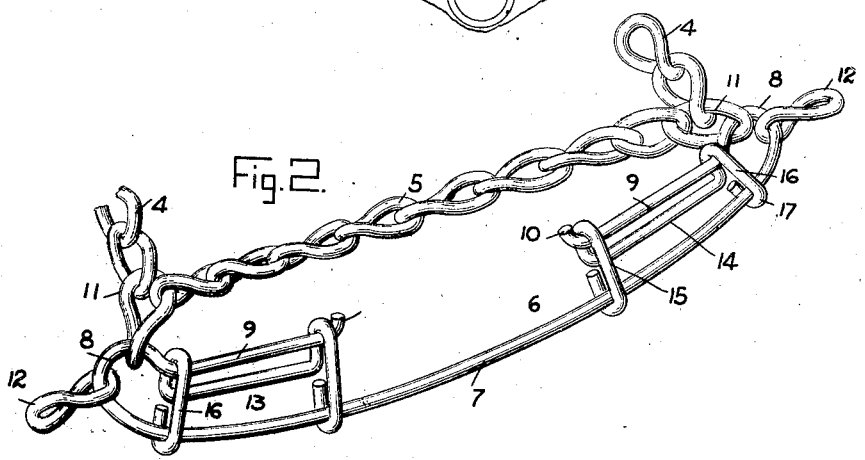

Figure 1 is a side elevation, showing a fragment of a driving wheel, disclosing a preferred embodiment of my invention in position on the tire thereof; and Fig. 2 is an enlarged side elevation of a portion of the chain, showing the reinforcing bar connecting different portions of the same.

In the drawings, there is shown a wheel A of any improved construction, carrying a tire B, about which tire is disposed anti-slipping devices C which particularly form the subject-matter of this application. The anti-slipping devices comprise in this instance a series of endless spaced-apart chains 3, parallel portions 4 of which extend transversely across the tread of the tire, and parallel side portions 5 of which extend along the side of the tire and upon opposite sides of the same. It is to be understood, as described in my previous application, that these endless chains may be positioned across the tire until the working portions have been worn down, when these working portions are drawn around to the side, presenting a new, unused portion of the chain to be worked upon, and in this way the entire chain is used. The worn portion 5 is apt to break, and in order to prevent the chain from flying off the wheel in case of such a break, there is, extending substantially parallel to the portion 5, a reinforcing bar 6, comprising a slightly arched member or bar 7, each end of which is bent back upon itself to form a loop 8, and these bent-back portions extend a short distance toward each other, to form a straight- keeper-engaging portion 9, and each end is slightly turned away from the portion 7 to form a stop 10; and the loop 8 engages the corner link 11 in the chain 3, between the side portion 5 and the tread-portion 4, each of said loops 8 being offset from the arch portion 7, so as to hold the end link of the transverse portion of the endless chains adjacent the end link of the connecting chain 12. Also engaging the loop 8 of the adjacent bars 6, are spacing chains 12, which connect the spaced-apart chains 3, so that the loop 8 forms in effect the connecting means between the chains 3 and 12.

Slidably mounted upon the portions 7 of the reinforcing bars 6 is a pair of keepers 13, one at each end, which keepers are formed of a single piece of wire comprising a straight central portion 14 extending parallel to and between the portions 7 and 9, each end of which is first looped upward about the portion 9, is then bent downward and outward relative to the portion 14 to form a connecting strip 15 substantially at right-angles to the portion 7, and each extreme end is then bent back upon itself to embrace the portion 7. The opposite end of the keeper is similar in construction to the inner ends, except that the outwardly-extending portion 16 extends outward at a relatively sharp angle, shown more particularly in Fig. 1, so that the loop 17 will be brought relatively close to the end of the chain 12, to prevent the said chain from slipping any material distance in the loop.

By this construction, it will be seen that the portions 9 and 7 may be sprung toward each other a distance sufficient to permit the upper loop to slide over the stop 10, and the keeper may then be slid onto the central part of the portion 7. Then the link 11 may be disengaged from the portion 9, and the chain 3 may be re-disposed on the tire, the loop 8 engaging the new corner link, and so on until the entire chain 3 has been worn out.

Having thus described my invention, I claim as new and desire to secure by Letters Patent:—

1. In an anti-skid device for vehicle tires, spaced-apart endless chains disposed about the tire, having tread-engaging portions and side portions, a reinforcing bar engaging opposite ends of each of said side portions, said reinforcing bar having its opposite ends bent back upon itself to form loops engaging the corner links between the side and tread-engaging portions of the chain, and a pair of keepers, one engaging each of said bent-back portions.

2. In an anti-skid device, an endless chain adapted to be placed in open position on the tire of a wheel, a reinforcing bar connecting spaced-apart points in said chain, said reinforcing bar having an outwardly-arched portion, the opposite ends of which are bent back upon themselves to form loops to engage the chain, a pair of keepers slidably mounted on said arched portion and engaging the bent-back ends of said bar, and means maintaining said keepers in position in said bar.

3. In an anti-skid device, a reinforcing member consisting of a bar, the central portion of which is slightly arched and each end of which is bent back upon itself to form a loop, and a keeper slidably mounted on said central portion and adapted to engage one of said bent back portions.

4. In an anti-skid device, a reinforcing member consisting of a bar, the central portion of which is slightly arched and each end of which is bent back upon itself to form a loop, said bent back portion being substantially parallel with said central portion and a keeper slidably mounted on said central portion and adapted to engage one of said bent back portions, said central portion and bent back portion being normally sprung apart to maintain said keeper in position.

5. In an anti-skid device, a reinforcing member consisting of a bar, the central portion of which is slightly arched and each end of which is bent back upon itself to form a loop, a keeper slidably mounted on said central portion and adapted to engage one of said bent back portions, said central portion and bent back portion being normally sprung apart to maintain said keeper frictionally in position, and an integral stop on each end of said bent back portion, to retain said keeper in place.

6. In an anti-skid device, a reinforcing member consisting of an integral wire bar, the central portion of which is slightly arched and each end of which is bent back upon itself to form a loop, each of said loops being offset from said arched portion, and a keeper slidably mounted on said central portion and adapted to engage one of said bent back portions, said keeper comprising a pair of spaced apart loops engaging the arched portion of the bent back portion of the bar.

In testimony whereof I have signed my name to this specification in the presence of two subscribing witnesses.

DOUGLAS J. MARTIN.

Witnesses:
W. S. ORTON,
PHILIP D. ROLLHAUS.